(12) United States Patent
Quaiser

(10) Patent No.: US 9,151,865 B2
(45) Date of Patent: Oct. 6, 2015

(54) METHOD AND SYSTEM FOR SENSING LIGHT REFLECTIVE SURFACES IN A REFLECTIVE PHOTO-ELECTRIC SENSING SYSTEM INCLUDING A LIGHT CHANNELING DEVICE AND A FOREGROUND SUPPRESSION PERFORMANCE

(71) Applicant: FRABA NV, Heerlen (NL)

(72) Inventor: Andre Quaiser, Lawrenceville, NJ (US)

(73) Assignee: FRABA NV, Heerlen (NL)

( * ) Notice: Subject to any disclaimer, the term of this patent is extended or adjusted under 35 U.S.C. 154(b) by 348 days.

(21) Appl. No.: 13/758,349

(22) Filed: Feb. 4, 2013

(65) Prior Publication Data
US 2014/0217266 A1    Aug. 7, 2014

(51) Int. Cl.
*H01J 40/14*    (2006.01)
*G01V 8/22*    (2006.01)

(52) U.S. Cl.
CPC ...................... *G01V 8/22* (2013.01)

(58) Field of Classification Search
CPC ......... G01V 8/10; G01V 8/20; H03K 17/945; H03K 17/9638
USPC .......... 250/221, 225, 216, 239; 340/555–557; 356/373–375, 73, 4.01–4.09
See application file for complete search history.

(56) References Cited

U.S. PATENT DOCUMENTS 5,541,403 A * 7/1996 Heinonen et al. ............. 250/221
7,459,670 B2 * 12/2008 Lewin et al. .................. 250/221

* cited by examiner

*Primary Examiner* — Que T Le
(74) *Attorney, Agent, or Firm* — Porzio, Bromberg & Newman, P.C.

(57) ABSTRACT

A reflective photo-electric sensing system includes a transmitter for the transmission of light and a reflector for reflecting the light. The reflector being positioned in a far field. A light channeling device receives reflected light from the far field or from a near field and channels the received reflected light to a near field receiver or a far field receiver dependent on an angle of the received reflected light. An electrical signal is generated at the near field receiver or the far field receiver. A controller evaluates the electrical signal of the near field receiver and the electrical signal of the far field receiver and generates an actuation signal dependent on the evaluation.

21 Claims, 5 Drawing Sheets

METHOD AND SYSTEM FOR SENSING LIGHT REFLECTIVE SURFACES IN A REFLECTIVE PHOTO-ELECTRIC SENSING SYSTEM INCLUDING A LIGHT CHANNELING DEVICE AND A FOREGROUND SUPPRESSION PERFORMANCE

BACKGROUND OF THE INVENTION

1. Field of the Invention

The present invention relates to a light reflective photo-electric sensing system including a method and system for sensing objects, which can be light reflective surfaces, within the system and providing an actuation signal if objects are present. The method and system can be used in a non-contact type sensor entrapment protection system.

2. Description of Related Art

Non-contact type sensor entrapment systems are known. U.S. Patent Application Publication No. 2011-0049339-A1, hereby incorporated by reference into this application, describes a photo-electric eye safety system used in conjunction with a motorized barrier operator system having a primary photo-electric eye safety device, which includes a primary emitter mounted at one side of an opening enclosed by the barrier, and a primary receiver mounted on another side of the opening and aligned to receive a beam from said primary emitter. A controller monitors the primary emitter and the primary receiver, and initiates corrective action if the beam is interrupted. A prior art non-contact sensor system 10 includes transmitter/receiver units 12 installed into photo-electric wall mounting units 13, as shown in FIG. 1. Transmitter unit 14 emits light beam 15 that is received by receiver unit 16. Sensor 17 is activated by interrupting light beam 15.

According to the UL Standard for Safety for Door, Drapery, Gate, Louver, and Window Operators and Systems, UL 325, paragraph 30.1.1, any automatically operated commercial/industrial door operator has to be connected to an external entrapment protection device. In paragraph 30.2.1, the standard states that an external entrapment protection device provided with, or as an accessory to, a commercial/industrial operator (or system) shall consist either of a contact type sensor or a non-contact type sensor.

It has been found that light reflective surfaces, such as metallic vehicle surfaces, can reflect light to the transmitter/receiver units thereby compromising the conventional photo-electric eye safety system. It is desirable to provide a method and system for sensing light reflective surfaces in a light reflective photo-electric sensing system. The system can be used to comply with the impact test of UL 325.

SUMMARY OF THE INVENTION

Some objects, such as light reflecting objects or objects having a metallic painted surface, that may be present in the monitoring system remit transmitted light with very high power or with a change in polarization. This can lead to the object being wrongly classified as a reflector in the monitoring system.

The present invention relates to a reflective photo-electric sensing system including a transmitter for the transmission of light and a reflector for reflecting the light, the reflector being positioned in a far field. A light channeling device receives reflected light from the far field or from a near field and channels the received reflected light to a near field receiver or a far field receiver dependent on an angle of the received reflected light. Accordingly, if the light is received at the wrong angle it not being reflected by the reflector positioned in the far field, but by an object. An electrical signal is generated at the near field receiver and the far field receiver. A controller evaluates the electrical signal of the near field receiver and the electrical signal of the far field receiver and generates an actuation signal dependent on the evaluation.

A threshold value for the far field and the near field electrical signals received at the controller can be used for foreground suppression and increasing reliability in the sensing system. The controller can make the following determinations: a. when the near field electrical signal is greater than the far field electrical signal then an object or reflector is present in the near field area and the actuation signal is generated; b. when the difference of the far field electrical signal minus the near field electrical signal is positive and less than a threshold value then a reflecting object is present in the far field area and the actuation signal is generated; and c. when the difference of the far field electrical signal minus the near field electrical signal is positive and greater than a threshold value then the reflector is present in the far field area and no actuation signal is generated. Through foreground suppression a distinction can be made between a highly reflective object, such as a metallic vehicle surface or light reflecting object in the near field and the reflector in the far field.

A transmitter polarization filter can be positioned after the transmitter. A receiver polarization filter can be positioned in front of the receiver. This allows only the passage of transmitted light of a given polarization on to the receivers. Preferably, the receiver polarization filter includes a polarization direction that is rotated by 90° to the polarization direction of the transmitter polarization filter. The reflector can be mapped so that it rotates the polarization direction by 90°. Accordingly, a distinction between a reflector and reflective objects that reflect the transmitted light comparably as strong as the reflection is made possible, since reflective objects do not generally change the polarization direction. In addition, ambient light can to a large extent be suppressed by the receiver polarization filter to further increase reliability.

The invention will be more fully described by reference to the following drawings.

DETAILED DESCRIPTION

Figure 1:
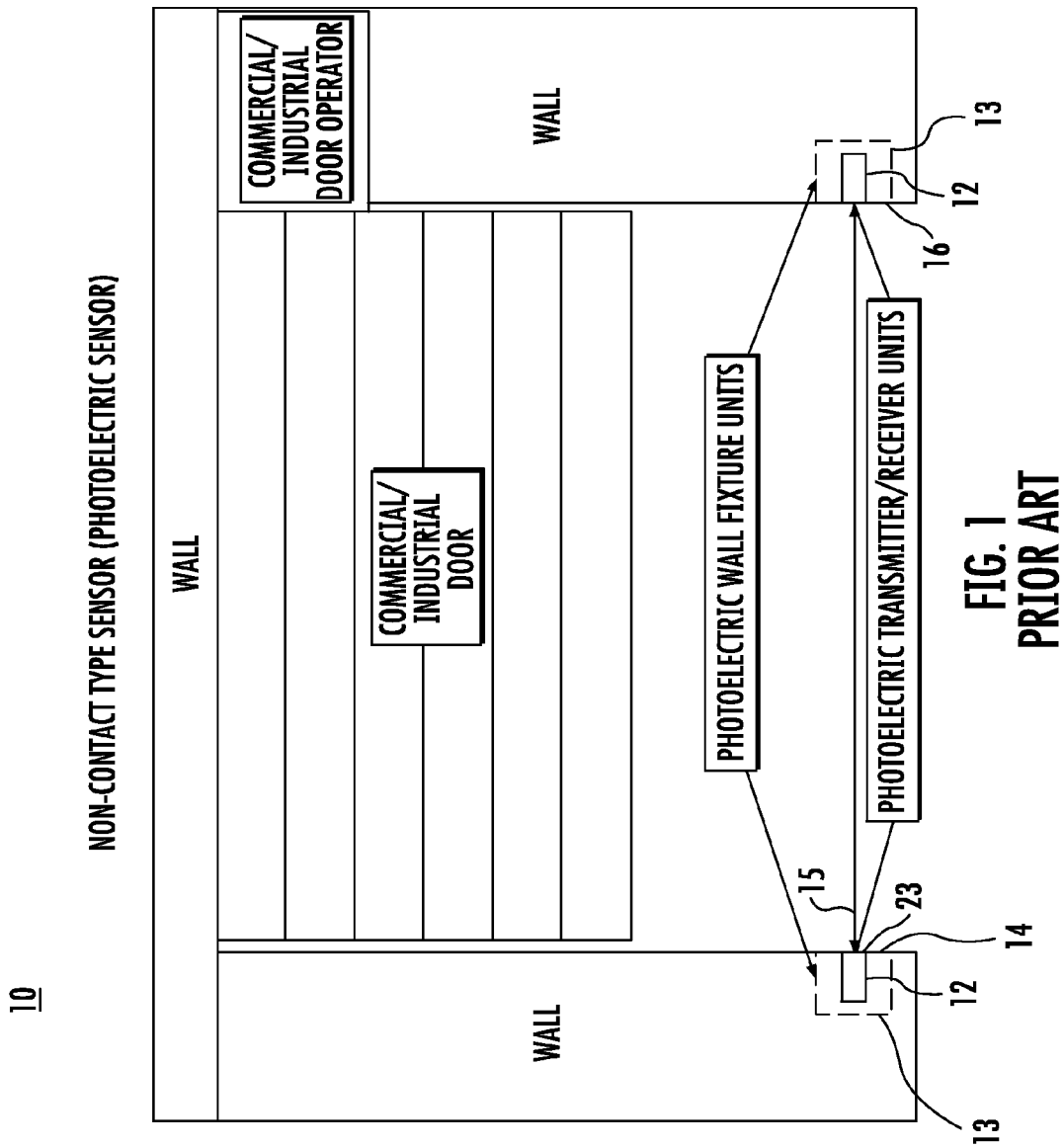
FIG. 1 is a schematic diagram of prior art non-contact sensing system.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
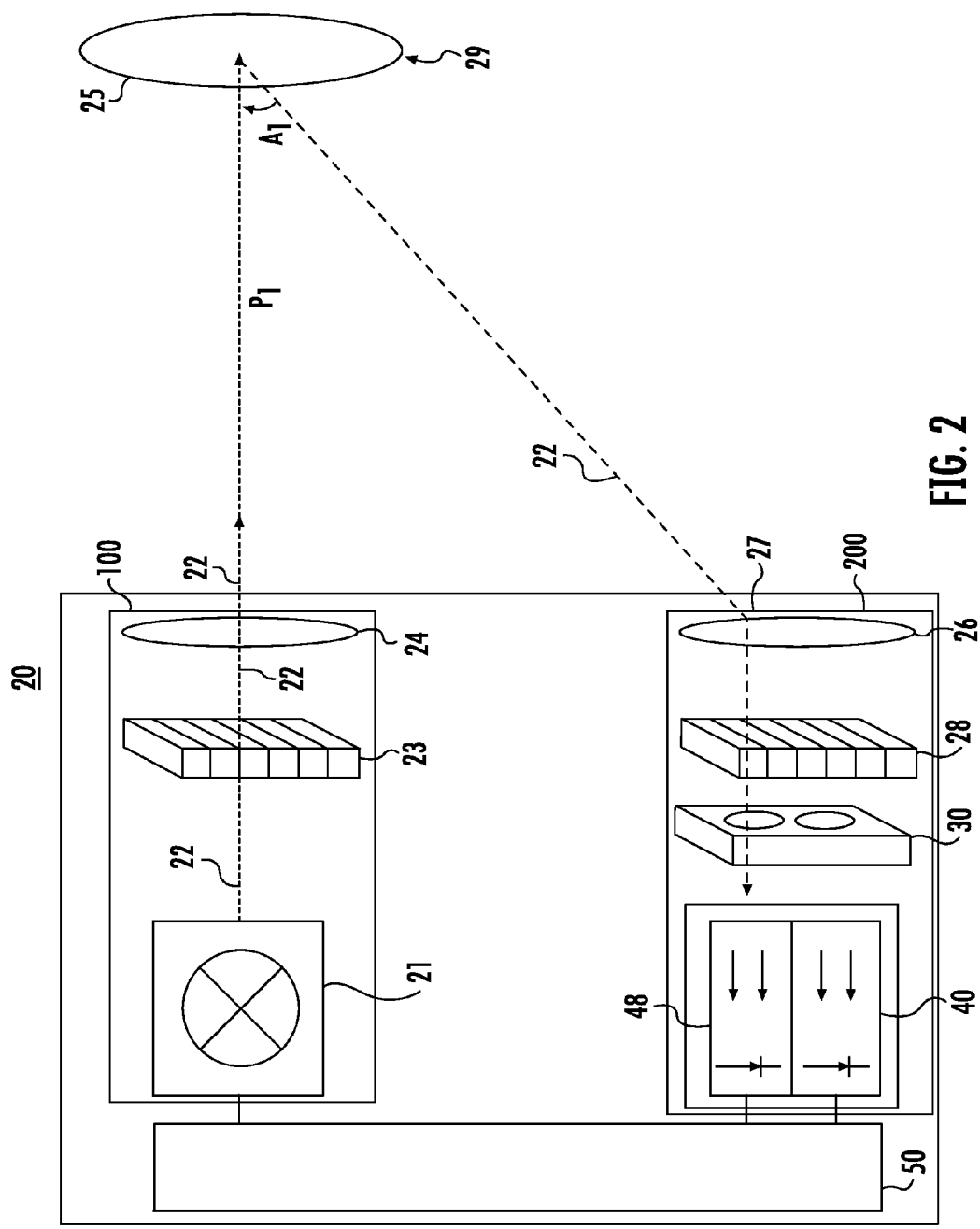
FIG. 2 is a schematic diagram of a reflective photo-electric sensing system in accordance with the teachings of the present invention.

FIG. 2 is a schematic diagram of light reflective photoelectric sensing system 20, in accordance with the teachings of the present invention. Transmitter 21 of transmitter unit 100 transmits light 22 through transmitter polarization filter 23.

Transmitter 21 can be a transmit chip. For example, transmitter 21 can be a transmitting chip of a LED, a diode laser or a Vertical-Cavity Surface-Emitting Laser (VCSEL). Transmitter polarization filter 23 polarizes light 22. Light 22 from transmitter polarization filter 23 is transmitted to transmission lens 24. Light 22 is transmitted from transmitter lens 24 to reflector 25 if no object is present in path $P_1$ of light 22.

Light 22 is reflected from reflector 25 at angle $A_1$ and is received at receiver lens 26 of receiver unit 200. Receiver lens 26 and reflector 25 can be aligned during installation such that beam spot 27 of reflected light 22 is received at receiver lens 26. In this embodiment, reflector 25 is positioned in far field area 29.

Reflector 25 can be a retroreflector for remitting light 22 with a polarization direction that is rotated by 90 degrees. Light 22 from receiver lens 26 is forwarded through receiver polarization filter 28 to light channeling device 30. The transmitted light can be visible light or infrared light. In combination with transmitter polarization filter 23 and receiver polarization filter 28, transmitted light of the wavelengths about 630 nm to about 660 nm is preferred.

Figure 3:
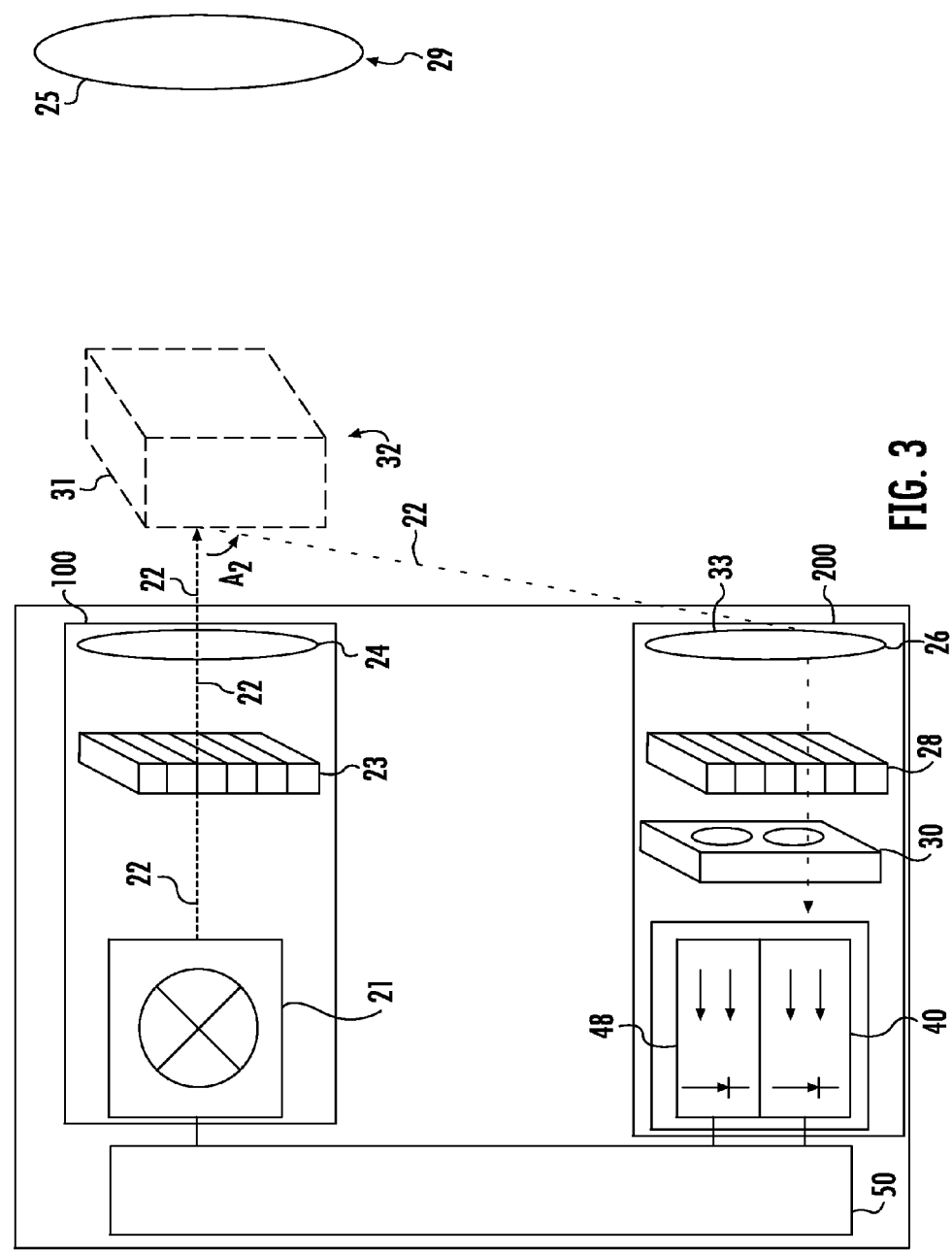
FIG. 3 is a schematic diagram of the reflective photo-electric sensing system in accordance with the teachings of the present invention including an object in the light transmission path.

FIG. 3 illustrates operation of light reflective photo-electric sensing system 20 when object 31 is positioned in path $P_1$. Object 31 can be formed of a light reflective material, for example, a metallic painted surface. In this embodiment, object 31 is positioned in near field area 32. When object 31 is present in path $P_1$, light 22 can be reflected from object 31 at angle $A_2$ and beam spot 33 of reflected light 22 is received at receiver lens 26 of receiver unit 200. Typically, light remitted from object 31 is remitted with no change of polarization direction. In this case, receiver polarization filter 28 filters the received light 22 and received light 22 cannot pass receiver polarization filter 28.

In the case, when object 31 is formed of a light reflective material, object 31 can reflect a substantial portion of light 22 with a change of polarization direction. In this case, light from receiver polarization filter 28 is passed to light channeling device 30.

Figure 4:
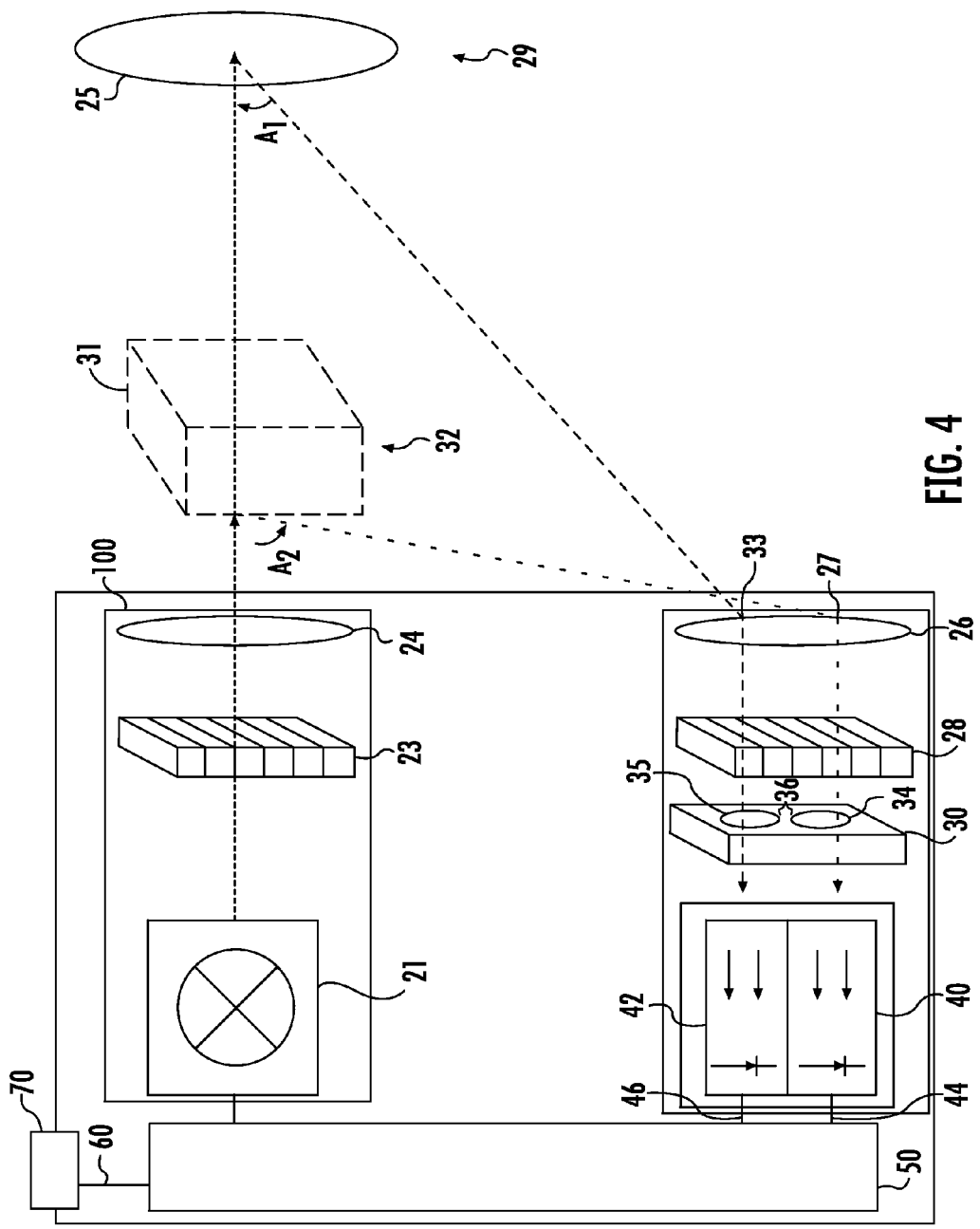
FIG. 4 is a schematic diagram of the light reflective photo-electric sensing system in accordance with the teachings of the present invention having operation with and without an object in the light transmission path.

Light channeling device 30 channels light 22 through one of apertures 34, 35 dependent on the angle of the light received at receiver lens 26, as shown in FIG. 4. Aperture 34 is arranged to receive light at angle $A_1$ from far field area 29. Aperture 35 is arranged to receive light at angle $A_2$ from near field area 32. The positioning, size of apertures 34, 35 and area 36 between apertures 34, 35 can be pre-selected to determine the focal range for respective beam spot 27 and beam spot 33. Area 36 between apertures 34, 35 correspondingly blocks light in a region between near field area 32 and far field area 29. Light 22 from aperture 34 is directed to far field receiver 40. Light 22 from aperture 35 is directed to near field receiver 42.

Far field receiver 40 can convert received light 22 into far field electrical signal 44. Near field receiver 42 can convert received light 22 into near field electrical signal 46. For example, far field receiver 40 and near field receiver 42 can each be a diode for converting received light 22 into a voltage.

Controller 50 compares the electrical signals from far field receiver 40 and near field receiver 42 to determine whether light received at receiver unit 200 is remitted by object 31 or reflector 25. Actuation signal 60 is generated in response to an evaluation of far field electrical signal 44 and near field electrical signal 46.

Controller 50 can determine the position of object 31 along path $P_1$ by evaluating the amount of received light 22 received at far field receiver 40 and the amount of received light 22 received at near field receiver 42. Controller 50 compares the electrical signals from far field receiver 40 and near field receiver 42 to determine position X of object 31. If position X of object 31 is not within a predetermined range along path $P_1$, actuation signal 60 is generated.

A threshold value for far field electrical signal 44 and near field electrical signal 46 received at controller 50 can be used for increasing reliability. Controller 50 can make the following determinations: a. when near field electrical signal 46 is greater than far field electrical signal 44, it is determined that object 31 or reflector 25 is present in near field area 32 and actuation signal 60 is generated; b. when the difference of far field electrical signal 44 minus near field electrical signal 46 is positive and less than a threshold value it is determined that reflecting object 31 is present in far field area 29 and actuation signal 60 is generated; and c. when the difference of far field electrical signal 44 minus near field electrical signal 46 is positive and greater than a threshold value it is determined that reflector 25 is present in far field area 29 and no actuation signal 60 is generated.

Controller 50 can carry out foreground suppression for near field area 32. The foreground suppression is performed by evaluating the ratio and/or the difference of near field electrical signal 44 and far field electrical signal 44.

In one embodiment, actuation signal 60 can be used for operating entrapment system 70. Entrapment system 70, in response to actuation signal 60 being detected can put out an assigned release signal which causes the driving mechanism of entrapment system 70 to be stopped or reversed.

Figure 5A:
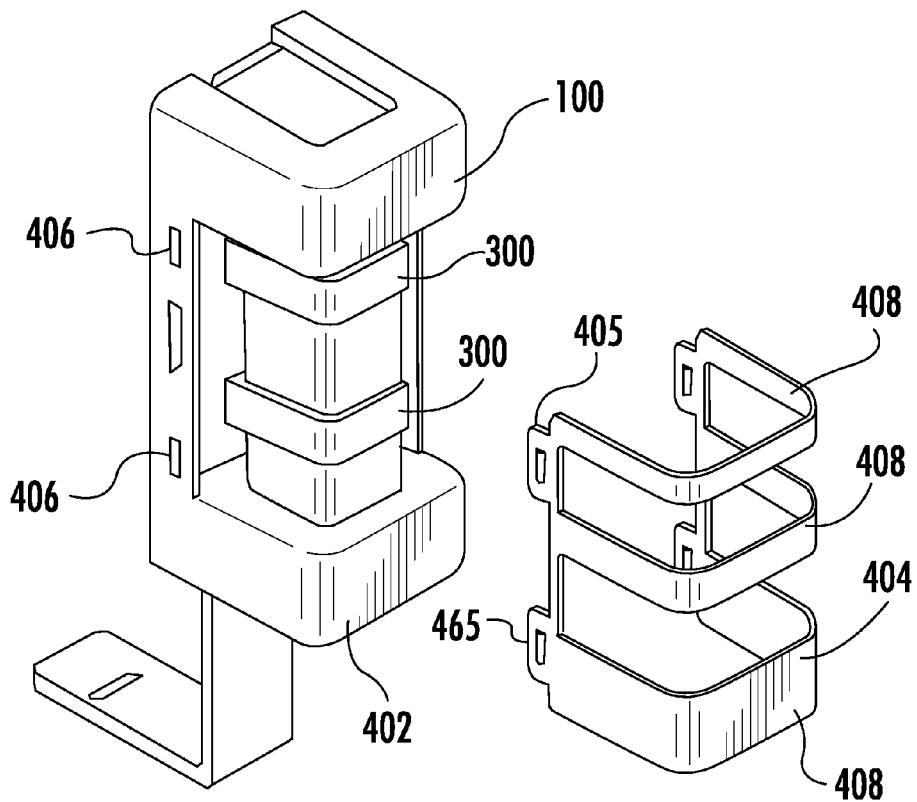
FIG. 5A is a schematic diagram of an enclosure in the open position for housing a sensor.
Figure 5B:
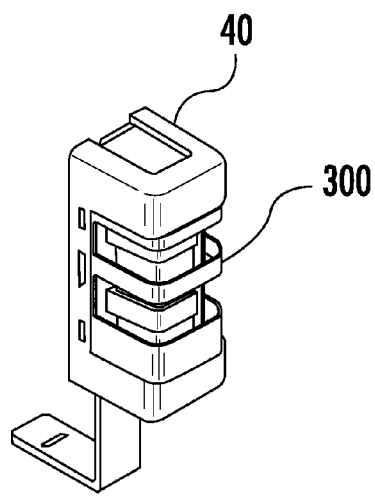
FIG. 5B is a schematic diagram of an enclosure in the closed position for housing a sensor.

Sensor 300 can include transmitter unit 100 and receiver unit 200 as shown in FIGS. 5A and 5B. Sensor 300 can be housed in enclosure 400. Enclosure 400 comprises a support base 402. Protective cage 404 can be attached to support base 402. Protections 405 of support protection cage 404 can be received in apertures 406 of support base 402. Bracket 410 of enclosure 400 can be attach enclosure 402 to a structure (not shown). Enclosure 400 can be used to allow sensor 300 to comply with the impact test of UL325. Cage 404 includes a plurality of support members 408.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A reflective photo-electric sensing system comprising:
   a transmitter for the transmission of light;
   a reflector for reflecting the light, said reflector being positioned in a far field from the transmitter;
   a light channeling device adapted for receiving reflected light from the reflector positioned in the far field and/or adapted for receiving reflected light from a near field of the transmitter if an object formed of a light reflective material is present in a path of the light and channeling the received reflected light to a near field receiver or a far field receiver dependent on an angle of the received reflected light;
   said near field receiver generating an electrical signal dependent on the received reflected light and said far field receiver generating an electrical signal dependent on the received reflected light; and a controller for evaluating the electrical signal of the near field receiver and the electrical signal of the far field receiver wherein the controller is adapted to carry out foreground suppression for the near field, the controller evaluates (a) when the electrical signal of the near field receiver is greater than the electrical signal of the far field receiver and an actuation signal is generated; (b) when the difference of the electrical signal of the far field receiver minus the electrical signal of the near field receiver is positive and less than a threshold value then the actuation signal is generated; and (c) when the difference of the electrical signal of the far field receiver minus the electrical signal of the near field receiver is positive and greater than a threshold value no actuation signal is generated, the foreground suppression is performed by evaluating the ratio and/or the difference of the electrical signal of the near field receiver and the electric signal of the far field receiver.

2. The reflective photo-electric sensing system of claim 1 wherein said light channeling device channels the received reflected light through a near field aperture or a far field aperture dependent on an angle of the received reflected light, said near field aperture channeling light to said near field receiver and said far field aperture channeling light to said far field receiver.

3. The reflective photo-electric sensing system of claim 2 wherein the positioning, size of said near field aperture and said far field aperture and area between said near field aperture and said far field aperture can be pre-selected to determine a focal range for said received reflective light.

4. The reflective photo-electric sensing system of claim 1 further comprising a transmitter polarization filter for the transmission of polarized transmitted light from the transmitter.

5. The reflective photo-electric sensing system of claim 4 further comprising a receiver polarization filter before the near field receiver and the far field receiver which only permits the passage of transmitted light of a given polarization on to the near field receiver and the far field receiver.

6. The reflective photo-electric sensing system of claim 5 wherein said reflector is a retroreflector for remitting light with a polarization direction that is rotated by 90 degrees.

7. The reflective photo-electric sensing system of claim 1 wherein the controller is adapted to carry out foreground suppression for the near field.

8. The reflective photo electric sensing system of claim 7, wherein the foreground suppression is performed by evaluating the ratio and/or the difference of the electrical signal of the near field receiver and the electric signal of the far field receiver.

9. The reflective photo-electric sensing system of claim 1 when the actuation signal is used for operating as an entrapment system.

10. The reflective photo-electric sensing system of claim 1 wherein the system is adapted to determine a position of a reflecting object in a path of the transmission of light.

11. The reflective photo-electric sensing system of claim 10, wherein the position of the object is used to send the actuation signal if the measured position is not within a pre-determined range.

12. A method for reflective photo-electric sensing comprising the steps of:

providing a transmitter for the transmission of light and a reflector for reflecting the light, said reflector being positioned in a far field;

channeling reflected light from the far field and/or from a near field to a near field receiver or a far field receiver dependent on an angle of the received reflected light;

generating an electrical signal dependent at said near field receiver or at said far field receiver dependent on the received reflected light; and evaluating the electrical signal of the near field receiver and the electrical signal of the far field receiver;

and generating an actuation signal dependent on the evaluation and providing foreground suppression for the near field wherein the foreground suppression is determined by evaluating (a) when the electrical signal of the near field receiver is greater than the electrical signal of the far field receiver, the actuation signal is generated; (b) when the difference of the electrical signal of the far field receiver minus the electrical signal of the near field receiver is positive and less than a threshold value then the actuation signal is generated; and (c) when the difference of the electrical signal of the far field receiver minus the electrical signal of the near field receiver is positive and greater than a threshold value no actuation signal is generated.

13. The method of claim 12 wherein said channeling of said reflected light comprises a light channeling device which channels the received reflected light through a near field aperture or a far field aperture dependent on the angle of the received reflected light, said near field aperture channeling light to said near field receiver and said far field aperture channeling light to said far field receiver.

14. The method of claim 13 further comprising the step of pre-selecting the positioning, size of said near field aperture and said far field aperture and area between apertures said near field aperture and said far field aperture to determine a focal range for said received reflective light.

15. The method of claim 12 further comprising a transmitter polarization filter for the transmission of polarized transmitted light from the transmitter.

16. The method of claim 15 further comprising a receiver polarization filter before the near field receiver and the far field receiver which only permits the passage of transmitted light of a given polarization on to the near field receiver and the far field receiver.

17. The method of claim 16 wherein said reflector is a retroreflector for remitting light with a polarization direction that is rotated by 90 degrees.

18. The method of claim 12 further comprising the step of providing foreground suppression for the near field.

19. The method of claim 12 wherein a position of a reflecting object in the path of a light transmission is determined from the evaluation of the electrical signal of near field receiver and the electrical signal of the far field receiver.

20. The method of claim 19, wherein the actuation signal is generated if the determined position of the object is not within a given range.

21. The reflective photo-electric sensing system of claim 1 wherein the system complies with the impact test of UL325.

* * * * *